US012417878B2

(12) United States Patent
Suemasa et al.

(10) Patent No.: US 12,417,878 B2
(45) Date of Patent: *Sep. 16, 2025

(54) CERAMIC ELECTRONIC DEVICE WITH MULTILAYER CHIP HAVING CONCENTRATION PEAKS OF METAL ELEMENTS BETWEEN INTERNAL ELECTRODE LAYERS AND DIELECTRIC LAYERS, AND MANUFACTURING METHOD OF SAME

(71) Applicant: TAIYO YUDEN CO., LTD., Tokyo (JP)

(72) Inventors: Riki Suemasa, Takasaki (JP); Hidetoshi Masuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 18/189,126

(22) Filed: Mar. 23, 2023

(65) Prior Publication Data
US 2023/0317373 A1    Oct. 5, 2023

(30) Foreign Application Priority Data

Mar. 31, 2022   (JP) ................. 2022-059055

(51) Int. Cl.
*H01G 4/30*  (2006.01)
*H01G 4/008*  (2006.01)

(52) U.S. Cl.
CPC ............. *H01G 4/0085* (2013.01); *H01G 4/30* (2013.01)

(58) Field of Classification Search
CPC ........ H01G 4/30; H01G 4/012; H01G 4/0085; H01G 4/008
See application file for complete search history.

(56) References Cited

U.S. PATENT DOCUMENTS 11,915,882 B2 *  2/2024  Masuda ................... H01G 4/30
2004/0090721 A1 *  5/2004  Nagai ...................... H01C 1/14
                                                                361/15

(Continued)

FOREIGN PATENT DOCUMENTS

| JP | 04032213 A | * | 2/1992 |
| JP | 2003007562 A | | 1/2003 |
| WO | 2015016309 A1 | | 2/2015 |

OTHER PUBLICATIONS

Notice of Allowance issued by U.S. Patent and Trademark Office, dated Dec. 29, 2023, for U.S. Appl. No. 17/899,444, now U.S. Pat. No. 11,915,882. (14 pages).

*Primary Examiner* — David M Sinclair
(74) *Attorney, Agent, or Firm* — Law Office of Katsuhiro Arai

(57) ABSTRACT

A ceramic electronic device includes a multilayer chip in which each of a plurality of dielectric layers and each of a plurality of internal electrode layers are alternately stacked. There are a concentration peak of a first metal and a concentration peak of a second metal at different positions in a stacking direction of the plurality of internal electrode layers and the plurality of dielectric layers between a dielectric layer and an internal electrode layer next to the dielectric layer, the first metal and the second metal being different from a main component metal of the plurality of internal electrode layers. The second metal is easier to ionize than the first metal. The concentration peak of the second metal is closer to the dielectric layer than the concentration peak of the first metal.

21 Claims, 9 Drawing Sheets

(56) References Cited

U.S. PATENT DOCUMENTS

| | | | |
|---|---|---|---|
| 2009/0237859 A1* | 9/2009 | Nakamura | H01G 4/33 156/89.12 |
| 2014/0175942 A1* | 6/2014 | Banno | H10N 30/50 336/200 |
| 2016/0155571 A1 | 6/2016 | Doi et al. | |
| 2016/0217930 A1* | 7/2016 | Yamaguchi | H01G 4/0085 |
| 2019/0304695 A1* | 10/2019 | Kim | H01G 4/30 |
| 2020/0066454 A1* | 2/2020 | Cha | H01G 4/0085 |
| 2021/0098191 A1 | 4/2021 | Saito et al. | |
| 2021/0202172 A1* | 7/2021 | Kanzaki | H01G 4/012 |
| 2022/0139619 A1 | 5/2022 | Lee et al. | |
| 2022/0139630 A1 | 5/2022 | Yamada et al. | |
| 2022/0384109 A1 | 12/2022 | Masuda et al. | |
| 2023/0094498 A1 | 3/2023 | Mizuno | |
| 2023/0290576 A1 | 9/2023 | Mizuno | |
| 2023/0298820 A1 | 9/2023 | Masuda | |
| 2023/0317373 A1 | 10/2023 | Suemasa et al. | |

* cited by examiner

CERAMIC ELECTRONIC DEVICE WITH MULTILAYER CHIP HAVING CONCENTRATION PEAKS OF METAL ELEMENTS BETWEEN INTERNAL ELECTRODE LAYERS AND DIELECTRIC LAYERS, AND MANUFACTURING METHOD OF SAME

CROSS-REFERENCE TO RELATED APPLICATION

This application is based upon and claims the benefit of priority of the prior Japanese Patent Application No. 2022-059055, filed on Mar. 31, 2022, the entire contents of which are incorporated herein by reference.

FIELD

A certain aspect of the present invention relates to a ceramic electronic device and a manufacturing method of the ceramic electronic device.

BACKGROUND

In recent years, the demand for high-end multilayer ceramic capacitors with high capacity and high reliability has been increasing for in-vehicle and mobile terminals. Such ceramic electronic devices are used in applications such as DC decoupling, noise bypass, and voltage regulation in high frequency and power circuits.

SUMMARY OF THE INVENTION

According to an aspect of the present invention, there is provided a ceramic electronic device including: a multilayer chip in which each of a plurality of dielectric layers and each of a plurality of internal electrode layers are alternately stacked, wherein there are a concentration peak of a first metal and a concentration peak of a second metal at different positions in a stacking direction of the plurality of internal electrode layers and the plurality of dielectric layers between a dielectric layer and an internal electrode layer next to the dielectric layer, the first metal and the second metal being different from a main component metal of the plurality of internal electrode layers, wherein the second metal is easier to ionize than the first metal, and wherein the concentration peak of the second metal is closer to the dielectric layer than the concentration peak of the first metal.

According to another aspect of the present invention, there is provided a manufacturing method of a ceramic electronic device including: forming each of stack units by forming an internal electrode pattern on a dielectric green sheet; forming a multilayer structure by stacking the stack units; and firing the multilayer structure, wherein the internal electrode pattern includes a main component metal, a first metal, and a second metal which is easier to ionize than the first metal, and wherein the multilayer structure is fired so that, between a dielectric layer formed from the green sheet and an internal electrode layer formed from the internal electrode pattern next to the dielectric layer, there are a concentration peak of the first metal and a concentration peak of the second metal at different positions in a stacking direction, and the concentration peak of the second metal is closer to the dielectric layer than the concentration peak of the first metal.

DETAILED DESCRIPTION

In order to achieve small size and high capacity, the internal electrode layers and dielectric layers of ceramic electronic devices are becoming thinner. Although it is possible to realize a ceramic electronic device having a high capacity by thinning the internal electrode layers and the dielectric layers, there are problems such as breakage of the internal electrode layer and deterioration of the insulation of the dielectric layer. In order to solve this problem, it is conceivable to suppress the breakage of the internal electrode layers and the deterioration of the insulation properties by arranging a plurality of metal elements between the internal electrode layers and the dielectric layers. However, simply arranging a plurality of metal elements may not suppress performance deterioration.

A description will be given of an embodiment with reference to the accompanying drawings.

First Embodiment

Figure 1:
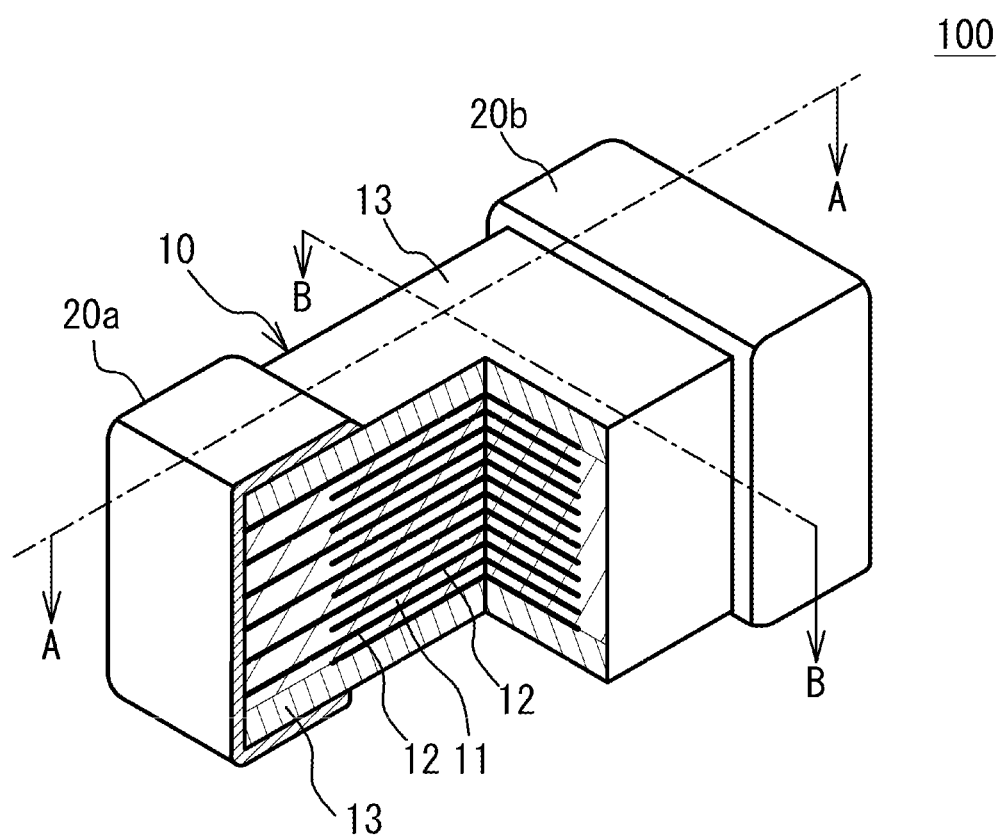
FIG. 1 illustrates a perspective view of a multilayer ceramic capacitor in which a cross section of a part of the multilayer ceramic capacitor is illustrated.
Figure 2:
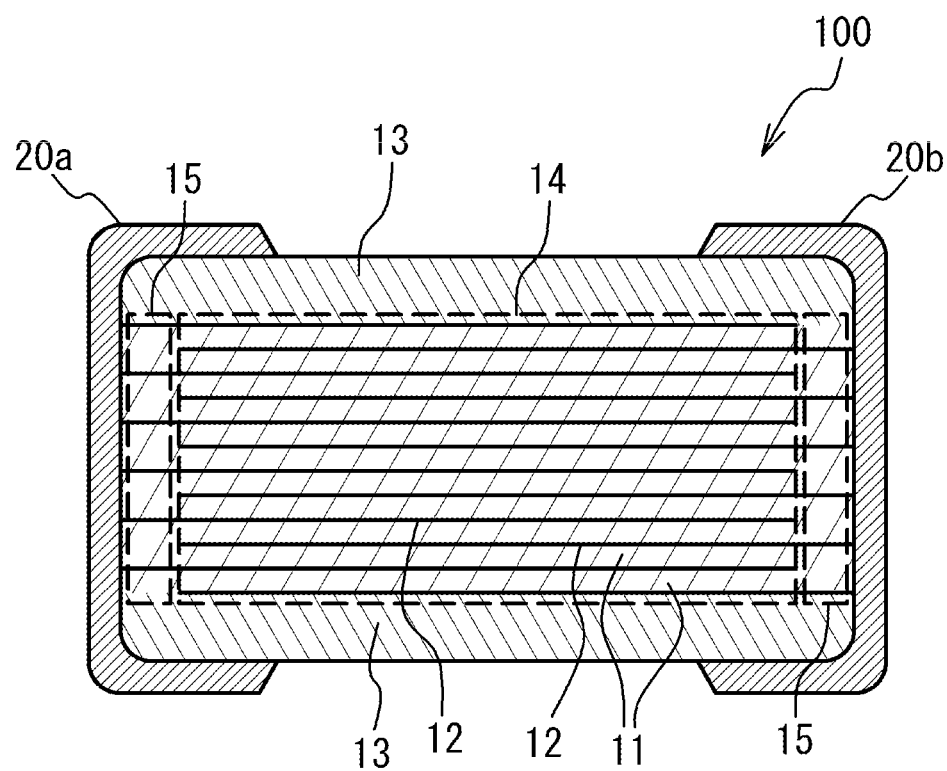
FIG. 2 illustrates a cross sectional view taken along a line A-A of FIG. 1.
Figure 3:
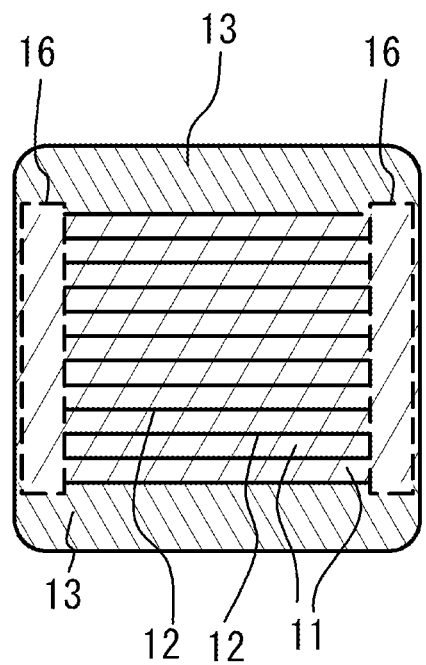
FIG. 3 illustrates a cross sectional view taken along a line B-B of FIG. 1.

FIG. 1 illustrates a perspective view of a multilayer ceramic capacitor 100 in accordance with a first embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

In order to achieve downsizing of the multilayer ceramic capacitor 100 and enlarge the capacity of the multilayer ceramic capacitor 100, it is preferable to form the dielectric layer 11 thin. For example, the thickness of the dielectric layer 11 per layer is 0.05 μm or more and 5 μm or less, or 0.1 μm or more and 3 μm or less, or 0.2 μm or more and 1 μm or less, or 0.6 μm or less. The thickness of the dielectric layer 11 is obtained by observing the cross section of the multilayer ceramic capacitor 100 with an SEM (scanning electron microscope), measuring the thickness of 10 different dielectric layers 11 at 10 points each, and calculating the average value of all the measurement points.

Figure 4:
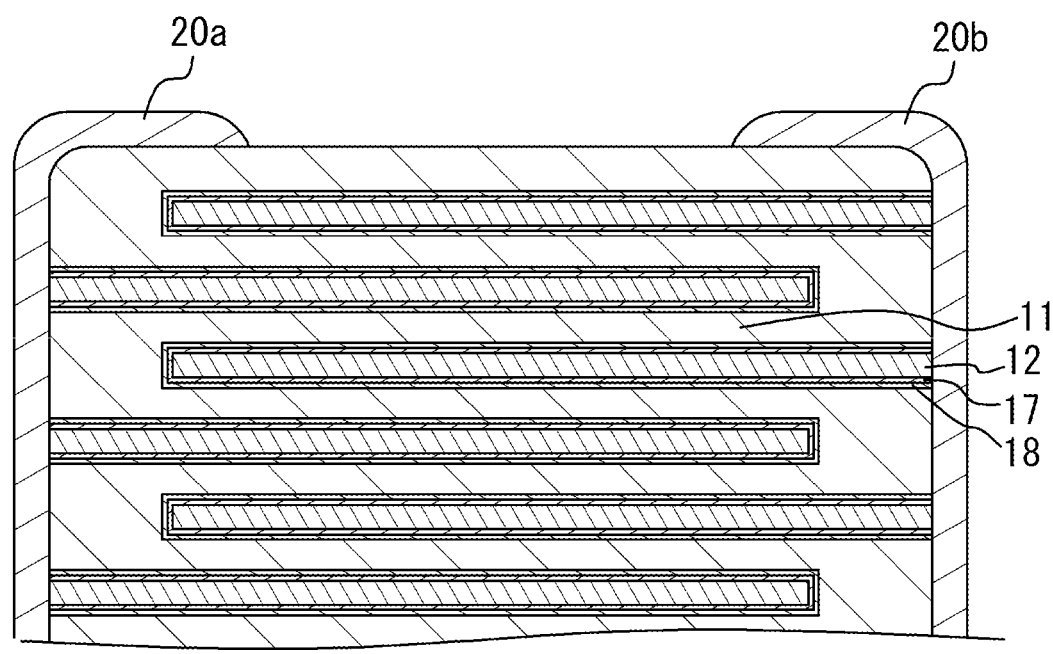
FIG. 4 is a diagram for explaining details of vicinity of an interface between an internal electrode layer and a dielectric layer.

FIG. 4 is a diagram for explaining the details of the vicinity of the interface between the internal electrode layer 12 and the dielectric layer 11. As illustrated in FIG. 4, the internal electrode layers 12 are covered with a first covering layer 17. Furthermore, the first covering layer 17 is covered with a second covering layer 18. For example, the first coating layer 17 is formed on the first main face which is one main face (the upper main face in FIG. 4) of the internal electrode layer 12. And the second coating layer 18 is formed on the first covering layer 17. The first coating layer 17 is formed under the second main face, which is the other main face (lower main surface in FIG. 4) of the internal electrode layer 12. And, the second coating layer 18 is formed under the first coating layer 17. Note that the first covering layer 17 may not necessarily cover the entire first main face and the entire second main face of the internal electrode layer 12, and may partially cover the first main face and the second main face of the internal electrode layer 12. Moreover, the second coating layer 18 may not necessarily have to cover the entire first coating layer 17 and may partially cover the first coating layer 17.

The first coating layer 17 is a layer containing a relatively large amount of a first metal different from the main component metal of the internal electrode layers 12. The second coating layer 18 is also a layer containing a relatively large amount of a second metal different from the main component metal of the internal electrode layers 12. The first metal and the second metal are different from each other. The second metal is a metal that ionizes more easily than the first metal under the same conditions. In addition, in each layer of the internal electrode layer 12, the first coating layer 17, and the second coating layer 18, not only a single metal exists, but each metal partially diffuses into each layer. The main component metal of the internal electrode layer 12 may be a base metal such as nickel (Ni) or copper (Cu), or may be a noble metal. For example, the internal electrode layer 12 contains 90 at % or more of the main component metal.

Figure 5A:
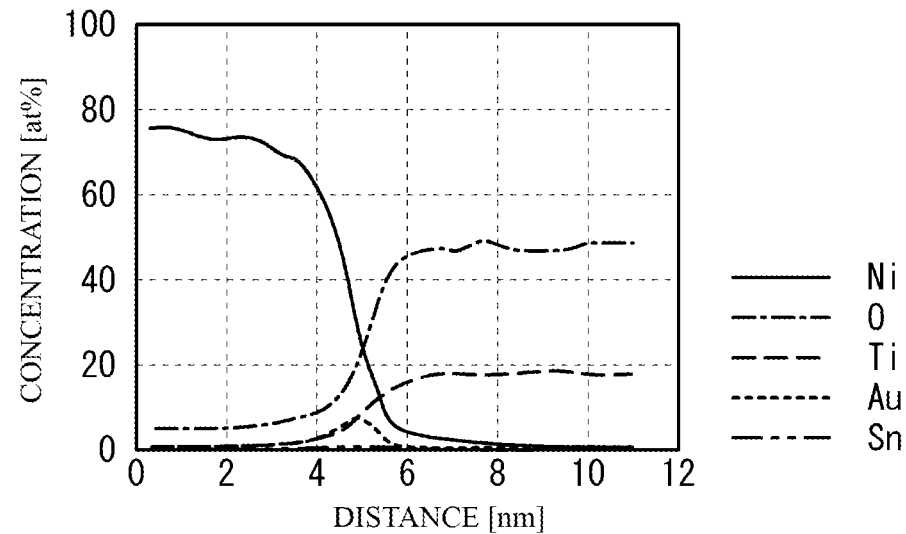
FIG. 5A to FIG. 5C are line analysis of each component element concentration for each sample point along a stacking direction of a dielectric layer and an internal electrode layer in a TEM image.
Figure 5B:
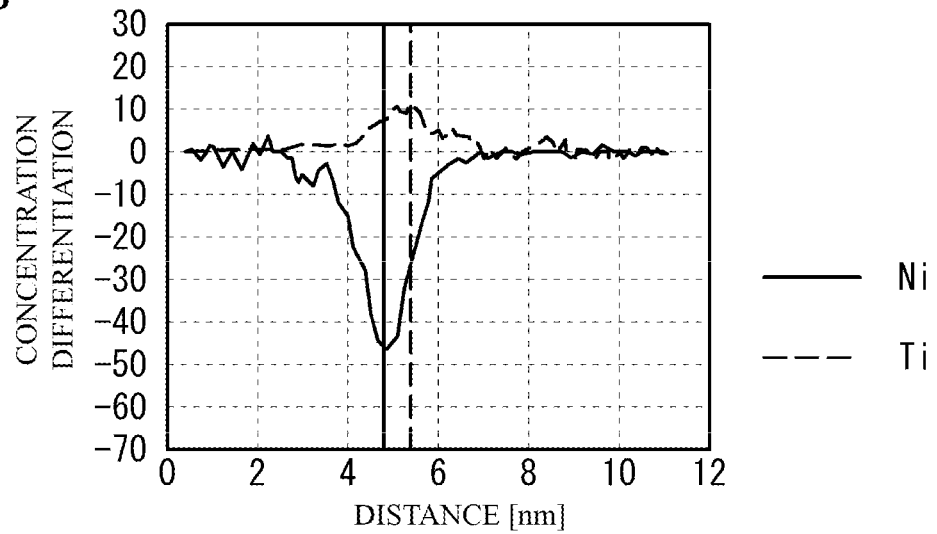
Figure 5C:
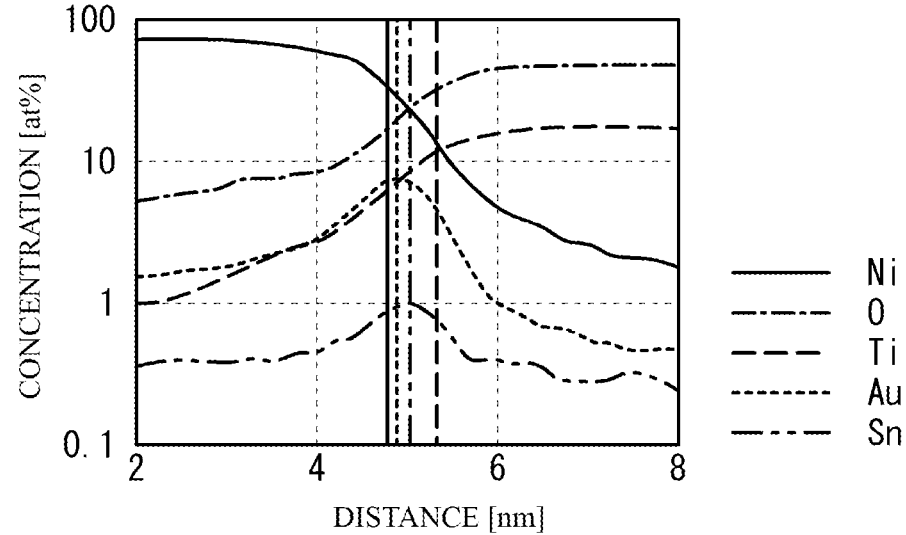

FIG. 5A to FIG. 5C are line analysis of each component element concentration for each sample point along the stacking direction of the dielectric layer 11 and the internal electrode layer 12 in the TEM (transmission electron microscope) image. In the examples of FIGS. 5A to 5C, as an example, Ni is used as the main component metal of the internal electrode layers 12, the first coating layer 17 contains a relatively large amount of gold (Au), and the second coating layer 18 contains a relatively large amount of tin (Sn), and barium titanate is used as the main component ceramic of dielectric layer 11.

Figure 9:
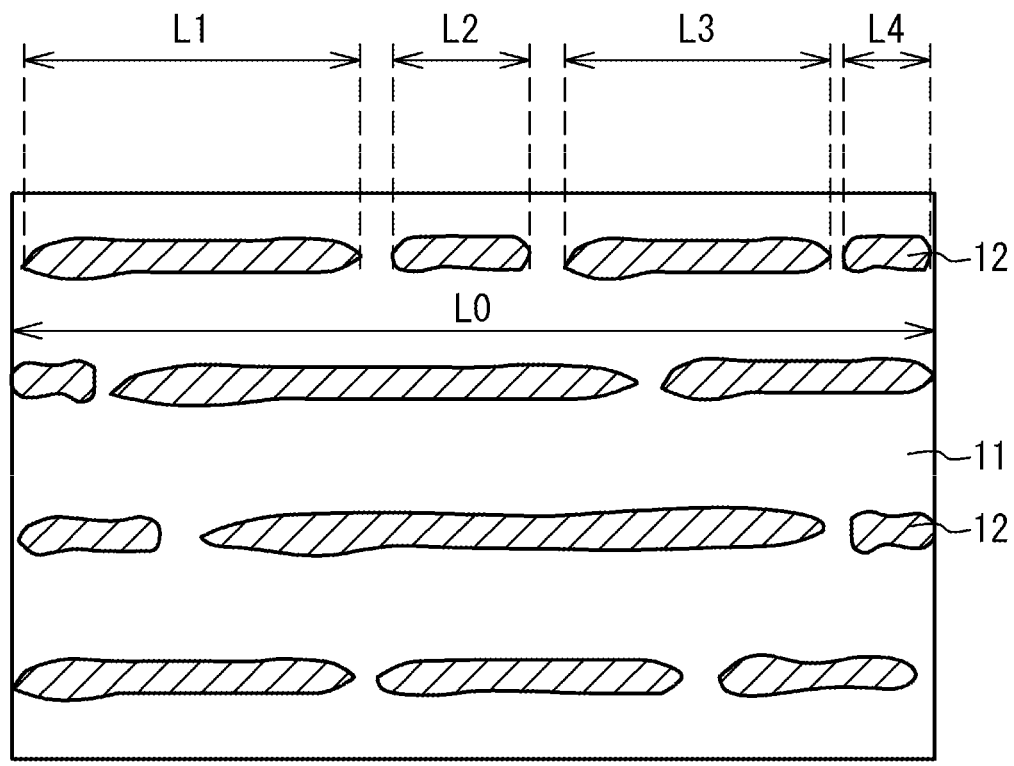
FIG. 9 illustrates a continuity modulus.

In FIG. 5A, the horizontal axis indicates the distance in the stacking direction, and the vertical axis indicates the concentration (at %) of each component. "0 nm" on the horizontal axis indicates the position expected to be the interface between the internal electrode layer 12 and the first covering layer 17. As the distance on the horizontal axis increases, the position gets closer to the dielectric layer 11 in the stacking direction. As illustrated in FIG. 5A, the concentration of Ni, which is the main component metal of the internal electrode layer 12, is the highest at the distance "0 nm". As the dielectric layer 11 is approached, the Ni concentration decreases, the Au concentration and Sn concentration have a peak, and the titanium (Ti) concentration and oxygen (O) concentration increase. In the example of FIG. 5A, 9 points are averaged and smoothed in order to reduce noise.

FIG. 5B shows the result of differentiation with respect to the Ni concentration and Ti concentration in FIG. 5A. By specifying the steepest change point, the interface between the internal electrode layers 12 and the interface between the dielectric layers 11 can be specified. In the example of FIG. 5B, the interface of the internal electrode layer 12 is the position where the differential value of the Ni concentration is the smallest. Further, the interface of the dielectric layer 11 is the position where the differential value of the Ti concentration is the largest. A large amount of Au and Sn is present between the interface of the dielectric layer 11 and the interface of the internal electrode layer 12.

FIG. 5C is a diagram showing the results of FIG. 5A in logarithm on the vertical axis. As illustrated in FIG. 5C, a peak of Au concentration and a peak of Sn concentration appear between the interface of the dielectric layer 11 and the interface of the internal electrode layer 12. The Au concentration peak is positioned closer to the Ni interface than the Sn concentration peak. The Sn concentration peak is located closer to the Ti interface than the Au concentration peak. In this way, between the interface of the dielectric layer 11 and the interface of the internal electrode layer 12, the concentration peak of the first metal relatively abundantly contained in the first coating layer 17 and the concentration peak of the second metal relatively abundantly contained in the second coating layer 18 are present at different positions in the stacking direction of the dielectric layers 11 and the internal electrode layers 12. Specifically, the concentration peak of the first metal is located on the side of the interface of the internal electrode layer 12. And the concentration peak of the second metal, which is more ionizable than the first metal, is located on the side of the interface side of the dielectric layer 11.

According to such a configuration, the effect of the first metal and the effect of the second metal are exhibited individually. For example, when the first metal exerts an effect of suppressing a decrease in reliability of the dielectric layers 11 and the second metal exerts an effect of suppressing a decrease in the continuity modulus of the internal electrode layers 12, the effect of suppressing a decrease in reliability is enhanced and the effect of suppressing a decrease in continuity modulus is enhanced, compared to the case where an alloy layer in which the first metal and the second metal are uniformly mixed is provided. Further, when the first metal exerts the effect of suppressing the reliability deterioration of the dielectric layer 11 and the second metal also exerts the effect of suppressing the reliability deterioration of the dielectric layer 11, the effect of suppressing a decrease in reliability is enhanced, compared to the case where an alloy layer in which the first metal and the second metal are uniformly mixed is provided. As described above, the effect of the first metal and the effect of the second metal are exhibited separately, thereby suppressing deterioration in the performance of the multilayer ceramic capacitor 100. This effect is remarkably exhibited when the dielectric layer 11 is formed thin (for example, 0.6 μm or less) and the insulating properties are not sufficiently ensured. By combining a noble metal and a base metal or by combining a base metal and a base metal as the first metal and the second metal, the amount of the noble metal used can be reduced.

Furthermore, since the second metal is a metal that is more easily ionized than the first metal, the second metal is likely to be strongly bonded with oxygen in the ceramic contained in the dielectric layer 11, forming a stable oxide. Since the second metal is located closer to the dielectric layer 11 than the first metal is, the phase with a high electrical barrier (phase with low electron affinity) is located near the dielectric layer 11. In addition, since the second metal is strongly bonded to oxygen contained in the dielectric layers 11, an increase in oxygen vacancies between the internal electrode layers 12 and the dielectric layers 11 is suppressed. As a result, deterioration in performance of the multilayer ceramic capacitor 100 can be suppressed.

When Ni or Cu is used as the main component metal of the internal electrode layer 12, for example, arsenic (As), Au, cobalt (Co), chromium (Cr), Cu, iron (Fe), indium (In), iridium (Ir), magnesium (Mg), osmium (Os), palladium (Od), platinum (Pt), rhenium (Re), rhodium (Rh), ruthenium (Ru), selenium (Se), Sn, tellurium (Te), vanadium (V), tungsten (W), yttrium (Y), zinc (Zn) or the like can be used as the metal for suppressing deterioration of insulation reliability of the dielectric layer 11.

When using Ni or Cu as the main component metal of the internal electrode layers 12, for example, silver (Ag), Cr, Ir, Mg, molybdenum (Mo), Os, Pd, Pt, Re, Rh, Ru, Y, W or the like can be used as the metal for suppressing deterioration of the continuity modulus of the internal electrode layer 12.

When Ni or Cu is used as the main component metal of the internal electrode layers 12, for example, tantalum (Ta), Ti, or the like can be used as the metal having the effect of blocking diffusion between the internal electrode layers 12 and the dielectric layers 11.

When Ni or Cu is used as the main component metal of the internal electrode layers 12, for example, Cr, Ta, Ti, or the like can be used as the metal ensuring adhesion between the internal electrode layers 12 and the dielectric layers 11.

When using Ni or Cu as the main component metal of the internal electrode layers 12 and using a perovskite oxide such as barium titanate as the main component ceramic of the dielectric layers 11, for example, Cu or the like can be used as the metal for alleviating mismatch of the lattice between the internal electrode layers 12 and the dielectric layers 11.

When these metals are arranged in order of ease of ionization under the same conditions, In(558)<Y(600)<V(651)<Cr(653)<Mo(684)<Sn(709)<Ru(710)<Rh(720)<Ta(728)<Ag(731)<Mg (738)<Cu(745)<Re(756)<W(759)<Co(760)<Fe(762)<Pd(804)<Os(814)<Pt(864)<Ir(865)<Te(869)<Au(890)<Zn(906)<Se(941)<As (944). Preferably, the first metal and the second metal are selected from these metals. The numerical value in parentheses is the ionization energy (kJ/mol) of a single element.

From the viewpoint of sufficiently obtaining the effect of the first metal and the effect of the second metal, it is preferable to provide a lower limit to the concentration peak of the first metal and the concentration peak of the second metal. The concentration peak of the first metal is preferably 1.0 at % or more, more preferably 5.0 at % or more. The concentration peak of the second metal is preferably 1.0 at % or more, more preferably 5.0 at % or more. Moreover, the additive concentration of the first metal and the second metal between two adjacent dielectric layers 11 is preferably 0.01 at % or more. That is, the additive concentration of the first metal and the second metal is preferably 0.01 at % or more, in the entire of the internal electrode layer 12, the first covering layer 17 and the second covering layer 18.

On the other hand, if the concentration peak of the first metal and the concentration peak of the second metal are too high, the first metal and the second metal diffuse excessively inside the dielectric layer 11, and the electrical properties of the dielectric layer 11 fluctuates largely from the target value. Therefore, it is preferable to provide an upper limit to the concentration peak of the first metal and the concentration peak of the second metal. The concentration peak of the first metal is preferably 30 at % or less, more preferably 10 at % or less. The concentration peak of the second metal is preferably 30 at % or less, more preferably 10 at % or less. Moreover, the additive concentration of the first metal and the second metal between two adjacent dielectric layers 11 is preferably 20 at % or less. That is, the additive concentration of the first metal and the second metal is preferably 20 at % or less, in the entire of the internal electrode layer 12, the first covering layer 17 and the second covering layer 18.

In order to form one layer of the first metal, a space of at least the atomic radius of the first metal is required. Therefore, it is preferable to set a lower limit for the distance from the interface of the internal electrode layer 12 to the concentration peak of the first metal in the stacking direction. On the other hand, if the interval is too large, the effect starts to saturate. Therefore, it is preferable to set an upper limit for the interval. In the stacking direction, the distance from the interface of the internal electrode layer 12 to the concentration peak of the first metal is, for example, 0.1 nm or more and 2 nm or less, 0.1 nm or more and 1.5 nm or less, and 0.1 nm or more and 1 nm or less. In the stacking direction, the distance from the concentration peak of the first metal to the concentration peak of the second metal is, for example, 0.1 nm or more and 2 nm or less, 0.1 nm or more and 1.5 nm or less, and 0.1 nm or more and 1 nm or less. In the stacking direction, the distance from the concentration peak of the second metal to the interface of the dielectric layer 11 is, for example, 0.1 nm or more and 2 nm or less, 0.1 nm or more and 1.5 nm or less, and 0.1 nm or more and 1 nm or less. Although the above example shows the case where there are two kinds of concentration peaks, it is preferable to have similar intervals even when there are three or more kinds of peaks.

The thickness of the internal electrode layer 12 is, for example, 10 nm or more and 1000 nm or less, 20 nm or more and 500 nm or less, and 50 nm or more and 300 nm or less. The thickness of the internal electrode layer 12 is determined by observing the cross section of the multilayer ceramic capacitor 100 with an SEM, measuring the thickness of 10 different internal electrode layers 12 at 10 points each, and calculating the average value of all the measurement points. can be measured.

Note that the number of metals whose concentration peaks appear at different positions in the stacking direction between the internal electrode layers 12 and the dielectric layers 11 is not limited to two. Three or more metal concentration peaks may appear at different positions in the stacking direction between the internal electrode layer 12 and the dielectric layer 11. In this case, the respective effects of three or more metals can be obtained.

Figure 6:
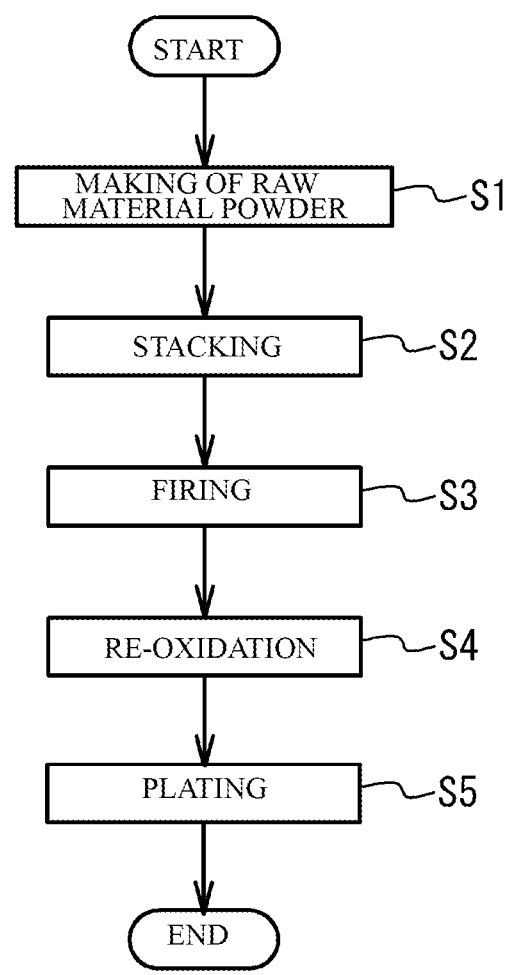
FIG. 6 illustrates a manufacturing method of a multilayer ceramic capacitor.

Next, a description will be given of a manufacturing method of the multilayer ceramic capacitors 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co(cobalt), Ni (nickel), Li (lithium), B (boron), Na (sodium), K (potassium) or Si (silicon), or a glass including cobalt, nickel, lithium, boron, sodium, potassium or silicon. Among the additive compounds, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained.

(Forming process of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is formed on a base material 51 by, for example, a die coater method or a doctor blade method, and then dried. The base material 51 is, for example, PET (polyethylene terephthalate) film.

Figure 7A:
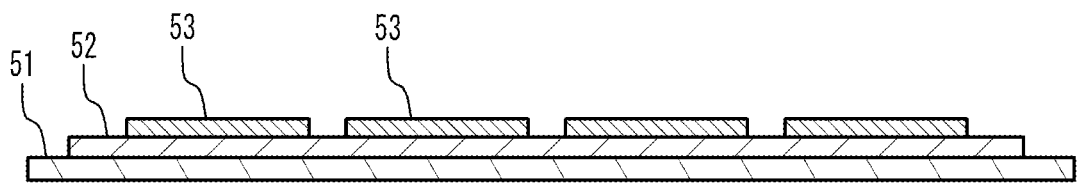
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The dielectric green sheet 52 on which the internal electrode pattern 53 is formed is a stack unit.

Figure 7B:
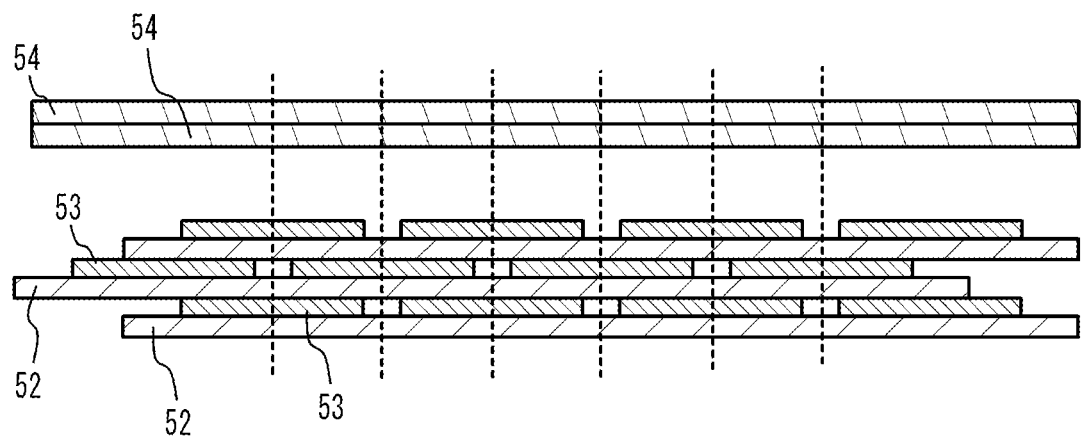

Next, the dielectric green sheets 52 are peeled from the base materials 51. As illustrated in FIG. 7B, the stack units are stacked.

Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 7B, the multilayer structure is cut along a dotted line. The components of the cover sheet 54 may be the same as those of the dielectric green sheet 52. Alternatively, the additive in the cover sheet 54 may be different from that in the dielectric green sheet 52.

(Firing process) The ceramic multilayer structure thus obtained is subjected to a binder removal treatment in an $N_2$ atmosphere. And then, an external electrode paste, which will be the external electrodes 20a and 20b, is applied on the ceramic multilayer structure by a dipping method or the like. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. Thus, the multilayer ceramic capacitor 100 is obtained.

(Re-oxidizing process) After that, a re-oxidation process may be performed in $N_2$ gas atmosphere at 600 degrees C. to 1000 degrees C.

(Plating process) After that, by a plating process, the plated layer is formed on the external electrodes 20a and 20b. For example, plated layer includes Cu, Ni, Sn and so on.

Figure 8:
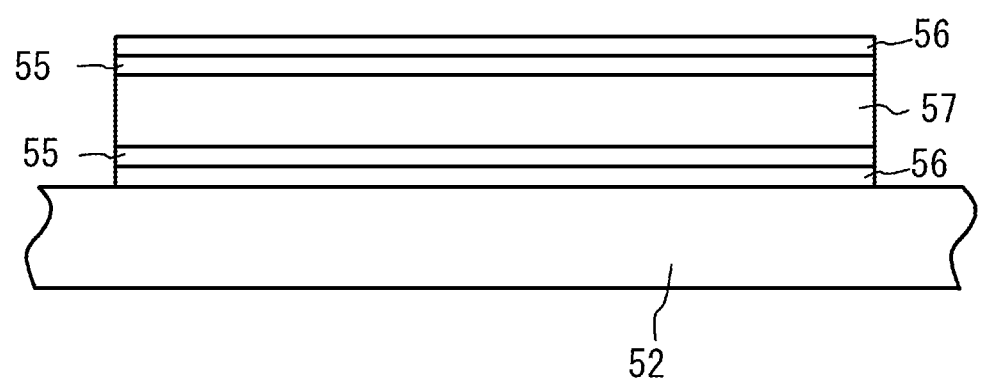
FIG. 8 illustrates details of formation of an internal electrode pattern on a dielectric green sheet.

FIG. 8 is a diagram for explaining in detail the film formation of the internal electrode pattern 53 on the dielectric green sheet 52. FIG. As illustrated in FIG. 8, on both main faces of a main component metal pattern 57 of the main component metal of the internal electrode layer 12, a first pattern 55 of the first metal, which the first coating layer 17 contains in a relatively large amount, is formed by sputtering. A second pattern 56 of the second metal, which the second coating layer 18 contains in a relatively large amount, is deposited on the first pattern 55 by sputtering. For example, the second pattern 56 is deposited on the dielectric green sheet 52 by sputtering. Next, the first pattern 55 is deposited on the second pattern 56 by sputtering. Next, a main component metal pattern is deposited on the first pattern 55 by sputtering. Next, the first pattern 55 is deposited on the main component metal pattern 57 by sputtering. Next, the second pattern 56 is deposited on the first pattern 55 by sputtering. The main component metal pattern 57, the first pattern 55 and the second pattern 56 act as the internal electrode pattern 53.

According to the manufacturing method of the multilayer ceramic capacitor 100 according to the present embodiment, by forming each pattern by sputtering as illustrated in FIG. 8, mixing of metals in each layer is suppressed. As a result, even if the metals are mutually diffused in the firing process, the structure illustrated in FIG. 4 can be obtained in the vicinity of the interfaces of the internal electrode layers 12 obtained after the firing process. In this case, when line analysis of each element concentration is performed for each sample point along the stacking direction in the TEM image, the concentration peak of the first metal, which is contained in a relatively large amount in the first coating layer 17, and the concentration peak of the second metal, which is contained in a relatively large amount in the second coating layer 18, are present at different positions. Thereby, the effect of the first metal and the effect of the second metal are exhibited individually. Also, the concentration peak of the second metal is positioned closer to the dielectric layer 11 than the concentration peak of the first metal. As a result, a phase with a high electrical barrier (a phase with low electron affinity) is arranged at a position close to the dielectric layer 11. In addition, since the second metal strongly binds to oxygen contained in the dielectric layers 11, an increase in oxygen vacancies between the internal electrode layers 12 and the dielectric layers 11 is suppressed. As a result, deterioration in performance of the multilayer ceramic capacitor 100 can be suppressed.

The method of forming the internal electrode pattern 53 is not limited to the sputtering described above. For example, on the dielectric green sheets 52, a metal paste in which powder of the main component metal of the internal electrode layers 12, powder of the first metal, and powder of the second metal are mixed may be printed. Also in this case, since the second metal has a property of being more easily ionized than the first metal, the second metal diffuses more toward the dielectric layer 11 than the first metal in the firing process, and the concentration peak of the second metal is positioned closer to the dielectric layer 11 than the concentration peak of the second metal.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

Example 1

An additive compound was added to the barium titanate powder, and the mixture was sufficiently wet-mixed and pulverized in a ball mill to obtain a dielectric material. A butyral-based organic binder and toluene and ethyl alcohol as solvents were added to the dielectric material, and a dielectric green sheet was formed on a PET substrate by a doctor blade method. A pattern with a thickness of 200 nm was formed on the surface of the dielectric green sheet by sputtering. In order to provide a dissimilar metal coating layer on the Ni surface layer of the main component metal pattern, an Au layer was formed as the first metal layer and a Cr layer was formed as the second metal layer before and after the formation of the Ni layer. Specifically, a Cr layer, an Au layer, a Ni layer, an Au layer, and a Cr layer were formed in this order. The thickness of the Au layer and the Cr layer was set to 1 nm on both sides, and the thickness of the Ni layer was set to 196 nm. A mask method using a metal mask was adopted for patterning. 100 layers of dielectric green sheets on which internal electrode patterns were formed were stacked so that the internal electrode patterns were alternately shifted, cut into a predetermined size, and metal conductors for external electrodes were applied to the two end faces where the internal electrode patterns ware exposed. A multilayer ceramic capacitor was obtained by applying the paste and firing.

For the obtained multilayer ceramic capacitor, the composition near the boundary between the dielectric layer and the internal electrode layer was line-analyzed by STEM-EDS (scanning transmission electron microscope). Variation in measurement data was averaged by averaging processing of about 9 points. The interface was defined as the position where the concentration change is steepest in the region across the boundary. That is, the interface was defined as the position where the maximum value/minimum value of the distance derivative of the concentration was shown. The interface positions of Ni and Ti extracted by the above operation were different, and the interval between them was about 0.5 nm. The concentrations of Au and Cr both had peak maxima, and the peak positions were between the interfaces of Ni and Ti. The respective peak positions were different from each other, and in the case of this device, they had an interval of about 0.2 nm. The Cr concentration peak was positioned closer to the dielectric layer than the Au concentration peak.

Example 2

In Example 2, the Sn layer was used as the first metal layer, and the Cr layer was used as the second metal layer. Other conditions were the same as in Example 1. In Example 2, the concentration peaks of Sn and Cr were confirmed at different positions between the interfaces of Ni and Ti. The Cr concentration peak was positioned closer to the dielectric layer than the Sn concentration peak.

Example 3

In Example 3, the first metal layer was the Fe layer, and the second metal layer was the Cr layer. Other conditions were the same as in Example 1. In Example 3, the concentration peaks of Fe and Cr were confirmed at different positions between the interfaces of Ni and Ti. The Cr concentration peak was positioned closer to the dielectric layer than the Fe concentration peak.

Example 4

In Example 4, the first metal layer was an Au layer, and the second metal layer was an Fe layer. Other conditions were the same as in Example 1. In Example 4, concentration peaks of Au and Fe were confirmed at different positions between the interfaces of Ni and Ti. The Fe concentration peak was positioned closer to the dielectric layer than the Au concentration peak.

Comparative Example 1

In Comparative Example 1, the Cr layer was used as the first metal layer, and the Au layer was used as the second metal layer. Other conditions were the same as in Example 1. In Comparative Example 1, the concentration peaks of Cr and Au were confirmed at different positions between the interfaces of Ni and Ti. The Au concentration peak was positioned closer to the dielectric layer than the Cr concentration peak.

Comparative Example 2

In Comparative Example 2, the Cr layer was used as the first metal layer, and the Sn layer was used as the second metal layer. Other conditions were the same as in Example 1. In Comparative Example 2, the concentration peaks of Cr and Sn were confirmed at different positions between the interfaces of Ni and Ti. The Sn concentration peak was positioned closer to the dielectric layer than the Cr concentration peak.

Comparative Example 3

In Comparative Example 3, the Cr layer was used as the first metal layer, and the Fe layer was used as the second metal layer. Other conditions were the same as in Example 1. In Comparative Example 3, the concentration peaks of Cr and Fe were confirmed at different positions between the interfaces of Ni and Ti. The Fe concentration peak was positioned closer to the dielectric layer than the Cr concentration peak.

Comparative Example 4

In Comparative Example 4, the Fe layer was used as the first metal layer, and the Au layer was used as the second metal layer. Other conditions were the same as in Example 1. In Comparative Example 4, the concentration peaks of Fe and Au were confirmed at different positions between the interfaces of Ni and Ti. The Au concentration peak was positioned closer to the dielectric layer than the Fe concentration peak.

For Examples 1 to 4 and Comparative Examples 1 to 4, a 125° C./18V HALT (Highly Accelerated Limit Test at 125° C., 18V/µm) was performed to measure the 50% lifetime. 50% lifetime is the time until failure of half of the total test devices. Twenty devices were tested at the same time, and the elapsed time until 10 devices failed was measured as 50% lifetime.

For Examples 1 to 4 and Comparative Examples 1 to 4, if the 50% lifetime was 30000 min or more, it was judged as good "○", and if the 50% lifetime was less than 30000 min, it was judged as bad "x". Table 1 shows the results.

TABLE 1

| | MAIN COMPONENT METAL | FIRST METAL | SECOND METAL | 50% LIFETIME | CONTINUITY MODULUS (%) |
|---|---|---|---|---|---|
| EXAMPLE 1 | Ni | Au | Cr | ○ | 90.4 |
| EXAMPLE 2 | Ni | Sn | Cr | ○ | 86.2 |
| EXAMPLE 3 | Ni | Fe | Cr | ○ | 89.7 |
| EXAMPLE 4 | Ni | Au | Fe | ○ | 71.2 |
| COMPARATIVE EXAMPLE 1 | Ni | Cr | Au | x | 70 |
| COMPARATIVE EXAMPLE 2 | Ni | Cr | Sn | x | 80.5 |
| COMPARATIVE EXAMPLE 3 | Ni | Cr | Fe | x | 66.2 |
| COMPARATIVE EXAMPLE 4 | Ni | Fe | Au | x | 63.6 |

As shown in Table 1, each 50% lifetime of Comparative Examples 1 to 4 was judged to be bad, and each 50% lifetime of Examples 1 to 4 was judged to be good. It is thought that this was because the concentration peak of the second metal, which is easier to ionize than the first metal, was positioned closer to the dielectric layer than the concentration peak of the first metal, the electrically high barrier phase was placed close to the dielectric layer, and the increase in oxygen vacancies between the internal electrode layer and the dielectric layer was suppressed.

Next, the continuity modulus of the internal electrode layers was measured for Examples 1 to 4 and Comparative Examples 1 and 2. FIG. 9 is a diagram showing the continuity modulus. As exemplified in FIG. 9, in an observation region of length L0 in a certain internal electrode layer 12, the sum of lengths L1, L2, to Ln is calculated, and Σ Ln/L0 which is a ratio of the metal portion can be defined as the continuity modulus of the layer. In Example 1, the continuity modulus was measured as 90.4%. In Example 2, the continuity modulus was measured as 86.2%. In Example 3, the continuity modulus was measured as 89.7%. In Example 4, the continuity modulus was measured as 71.2%. In Comparative Example 1, the continuity modulus was measured as 70%. In Comparative Example 2, the continuity modulus was measured as 80.5%. In Comparative Example 3, the continuity modulus was measured as 66.2%. In Comparative Example 2, the continuity modulus was measured as 63.6%.

Compared to Example 4, Examples 1 to 3 had a higher continuity modulus. It is thought that this was because Cr was added as the second metal to suppress the decrease in continuity modulus, Cr was present on the dielectric layer side, a stable oxide film was formed, and the diffusion and spheroidization of Ni atoms were suppressed. Although Cr was added in Comparative Examples 1 to 3, the continuous modulus was not as high as in Examples 1 to 3. It is thought that this was because Cr does not exist on the dielectric layer side, so that diffusion and spheroidization of Ni atoms were not sufficiently suppressed.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which each of a plurality of dielectric layers and each of a plurality of internal electrode layers are alternately stacked,
wherein there are a concentration peak of a first metal and a concentration peak of a second metal at different positions in a stacking direction of the plurality of internal electrode layers and the plurality of dielectric layers between a dielectric layer and an internal electrode layer next to the dielectric layer, the first metal and the second metal being different from a main component metal of the plurality of internal electrode layers,
wherein the second metal is easier to ionize than the first metal, and
wherein the concentration peak of the second metal is closer to the dielectric layer than the concentration peak of the first metal.

2. The ceramic electronic device as claimed in claim 1, wherein a section between the dielectric layer and the internal electrode layer is a section from a position of a minimum value of a differential value of a concentration of the main component metal of the internal electrode layer to a position of a maximum value of a differential value of the concentration of constituent metals of a main component ceramic of the dielectric layer, when a component element concentration is measured from the internal electrode layer toward the dielectric layer.

3. The ceramic electronic device as claimed in claim 1, wherein the concentration peak of the first metal and the concentration peak of the second metal are 1.0 at % or more.

4. The ceramic electronic device as claimed in claim 1, wherein the concentration peak of the first metal and the concentration peak of the second metal are 30 at % or less.

5. The ceramic electronic device as claimed in claim 1, wherein concentrations of the first metal and the second metal are 0.01 at % or more between the dielectric layer and another dielectric layer next to the dielectric layer.

6. The ceramic electronic device as claimed in claim 1, wherein concentration of the first metal and the concentration of the second metal are 20 at % or less between the dielectric layer and another dielectric layer next to the dielectric layer.

7. The ceramic electronic device as claimed in claim 1, wherein a thickness of the dielectric layer is 0.6 μm or less.

8. The ceramic electronic device as claimed in claim 1, wherein an interval from an interface of the internal electrode layer to the concentration peak of the first metal is 0.1 nm or more and 2 nm or less between the dielectric layer and the internal electrode layer.

9. The ceramic electronic device as claimed in claim 1, wherein an interval from the concentration peak of the first metal to the concentration peak of the second metal is 0.1 nm or more and 2 nm or less between the dielectric layer and the internal electrode layer.

10. The ceramic electronic device as claimed in claim 1, wherein an interval from the concentration peak of the second metal to an interface of the dielectric layer is 0.1 nm or more and 2 nm or less between the dielectric layer and the internal electrode layer.

11. The ceramic electronic device as claimed in claim 1 wherein a main component metal of the internal electrode layer is Ni.

12. The ceramic electronic device as claimed in claim 1, wherein the dielectric layer includes barium titanate.

13. The ceramic electronic device as claimed in claim 1, wherein the second metal is at least one of Cr, Fe, In, W, V, Y, Ta and Ti.

14. The ceramic electronic device as claimed in claim 1, wherein the first metal is Au, and
wherein the second metal is Cr.

15. The ceramic electronic device as claimed in claim 1, wherein an interval from an interface of the internal electrode layer to the concentration peak of the first metal is 0.1 nm or more between the dielectric layer and the internal electrode layer.

16. The ceramic electronic device as claimed in claim 1, wherein an interval from the concentration peak of the first metal to the concentration peak of the second metal is 0.1 nm or more between the dielectric layer and the internal electrode layer.

17. The ceramic electronic device as claimed in claim 1, wherein an interval from the concentration peak of the second metal to an interface of the dielectric layer is 0.1 nm or more between the dielectric layer and the internal electrode layer.

18. The ceramic electronic device as claimed in claim 1, wherein an interval from an interface of the internal electrode layer to the concentration peak of the first metal is 2 nm or less between the dielectric layer and the internal electrode layer.

19. The ceramic electronic device as claimed in claim 1, wherein an interval from the concentration peak of the first metal to the concentration peak of the second metal is 2 nm or less between the dielectric layer and the internal electrode layer.

20. The ceramic electronic device as claimed in claim 1, wherein an interval from the concentration peak of the second metal to an interface of the dielectric layer is 2 nm or less between the dielectric layer and the internal electrode layer.

21. A manufacturing method of a ceramic electronic device comprising:
- forming each of stack units by forming an internal electrode pattern on a dielectric green sheet;
- forming a multilayer structure by stacking the stack units; and
- firing the multilayer structure,
- wherein the internal electrode pattern includes a main component metal, a first metal, and a second metal which is easier to ionize than the first metal, and
- wherein the multilayer structure is fired so that, between a dielectric layer formed from the green sheet and an internal electrode layer formed from the internal electrode pattern next to the dielectric layer, there are a concentration peak of the first metal and a concentration peak of the second metal at different positions in a stacking direction, and the concentration peak of the second metal is closer to the dielectric layer than the concentration peak of the first metal.

* * * * *